Figure 1:
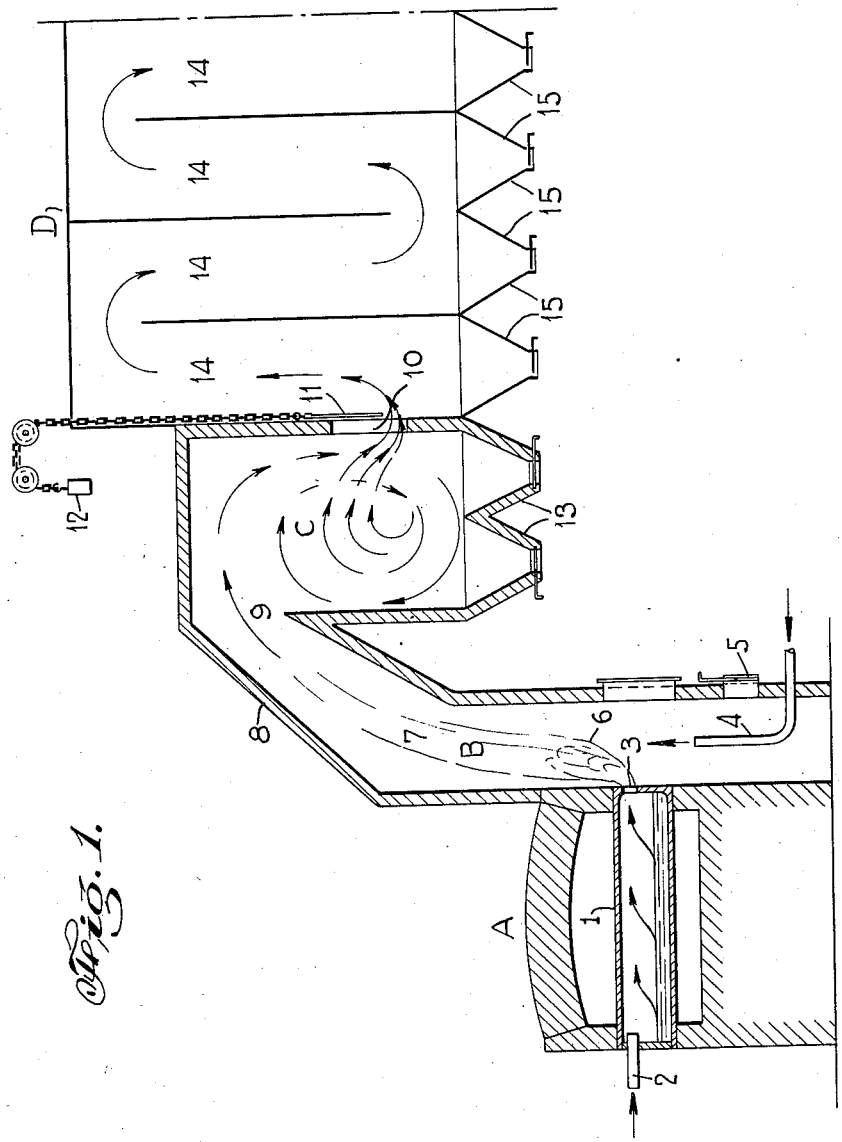

Sept. 1, 1936.  H. REINHARD  2,053,249

PROCESS OF TREATING ZINC OXIDE

Filed June 20, 1934   2 Sheets-Sheet 1

INVENTOR
Hugo Reinhard
BY
Hammond & Littell
ATTORNEYS

Sept. 1, 1936.  H. REINHARD  2,053,249
PROCESS OF TREATING ZINC OXIDE
Filed June 20, 1934   2 Sheets-Sheet 2
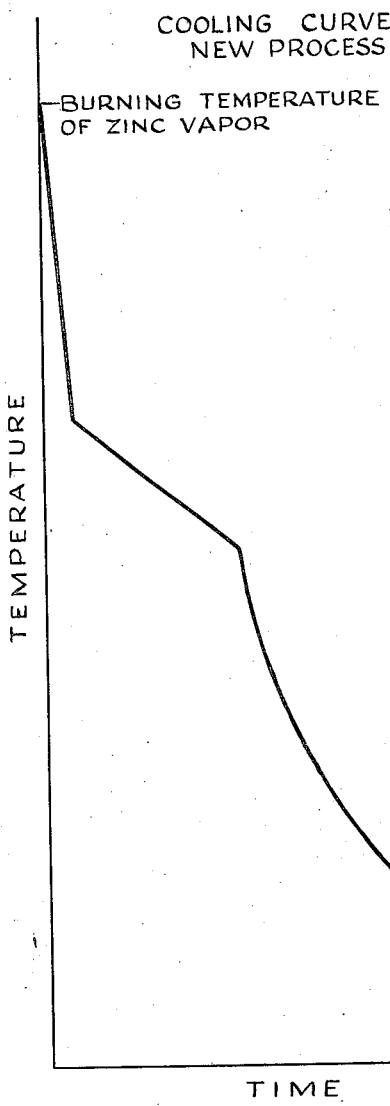
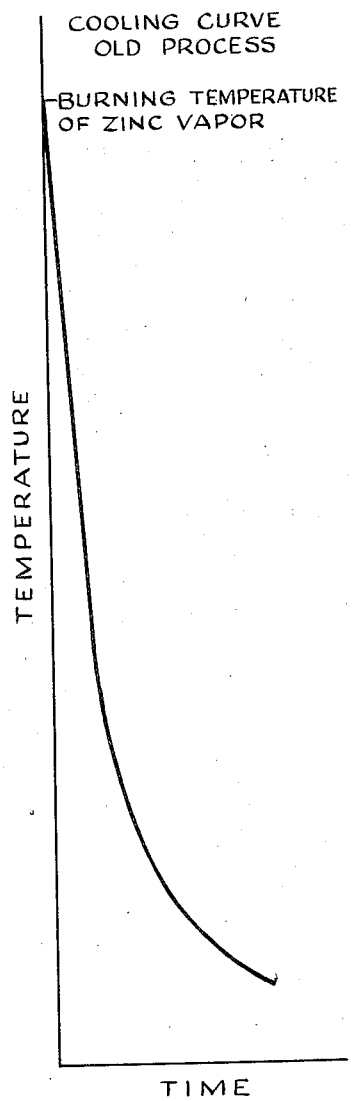
INVENTOR
Hugo Reinhard
BY
ATTORNEYS Patented Sept. 1, 1936

2,053,249

UNITED STATES PATENT OFFICE 2,053,249

PROCESS OF TREATING ZINC OXIDE

Hugo Reinhard, Oberhausen, Germany, assignor to Wilhelm Grillo Handelsgesellschaft, m. b. H., Hamborn, Germany, a corporation of Germany Application June 20, 1934, Serial No. 731,396
In Germany June 29, 1933

4 Claims. (Cl. 23—148)

The present invention relates to certain new and useful improvements in the process of manufacturing the zinc oxide from zinc metal in which the zinc metal is vaporized by distillation in a muffle furnace or the like, the vapor being subsequently burned to form zinc oxide which is deposited and collected in ducts, precipitating chambers, bag filters or the like. More particularly the object of my invention is the manufacture of zinc oxide of the highest quality in respect to its color and smoothness from raw materials not heretofore available for the production of such zinc oxide and without the necessity of re-treating the zinc oxide after it has been collected to improve its color and smoothness.

Zinc oxide has for many years been manufactured by two different processes known in the art as the American process and the French process. In the former the zinc oxide is manufactured direct from the ore by mixing the ore with a reducing agent, heating the mixture, burning the resulting gases and collecting the zinc oxide so formed. The French process used metallic zinc or by-products containing metallic zinc as a raw material. The metal is vaporized by boiling in an externally heated muffle; the vapors issuing from the muffle are burned and the resulting zinc oxide collected. My invention relates to the French process.

Although a large amount of oxide made by the French process has been sold at no higher price than American process oxide, there has always been a demand by manufacturers of the highest grade of white enamels and other similar products for oxide of exceptional whiteness and smoothness for which a substantial premium has been paid.

In the past these premium grades of oxide have been made by the French process from high grade metal such as that produced electrolytically. Furthermore, it has been necessary to re-treat the bulk of the oxide so produced in order to improve its color and working properties so that it will meet the high standard required by those who pay the substantial premium for these types of oxide.

I have now found a method by which zinc oxide, equal to or superior to the best grades at present produced under the French process, can be made from raw materials less expensive than high grade metal, for example, ordinary spelter, galvanizers' dross, remelted metal and similar products containing not more than about .2% cadmium.

My new method also makes unnecessary the re-treating process now used. It is now customary to take the cold oxide from the hoppers of the collecting system and heat it again to about 600°–700° C. and hold it at approximately this temperature for an hour or more. This is an extra operation and the labor and fuel required are added expenses which are eliminated by my new process.

My new process may be used in conjunction with the process I have described and patented in U. S. Patent #1,842,287, January 19, 1932, whereby the temperature of the zinc flame formed by the combustion of the zinc vapor issuing from the distilling vessels is enhanced by additional sources of heat, but the advantages of the present invention are not limited to such use.

In the general practice of the art, as far as I am aware, the zinc oxide fumes produced by the burning zinc flame in the so-called combustion chambers or niches of the usual zinc white furnaces are sucked off or evacuated therefrom by the draught of an exhausting fan or chimney and cooled as fast as they are produced. The exhauster or chimney is sometimes placed at the end of a series of ducts or depositing chambers in which the oxide precipitates, or a fan draws the fumes through a cooling system and blows them into a bag chamber or other depositing device. Combinations of both ways of transportation and collection of the fumes are also employed.

In every case the fumes drawn from the point of combustion by the suction undergo a relatively sudden drop of temperature, in the form of a steep gradient from about 1000° C. or more to about 500° or less. The rapid cooling is partly due to radiation of heat from the walls of the ducts chambers, etc., as well as to the sudden expansion of the gases entering the spacious cooling or precipitating chambers, but it is principally due to the admixture of relatively large quantities of cool air introduced into the combustion chamber by the draught of the exhausting fan or by a separate blower in excess of the volume necessary for the combustion proper.

It is due to this sudden drop of temperature that the "hot" combustion does not give the optimum quality of zinc oxide; in fact I have found that an increase in the combustion temperature, however high, is not by itself the most efficient means, viz.: the best possible thermal condition for obtaining a zinc oxide quality of the best purity, whiteness and dispersibility in the ordinary vehicle.

My present invention is based upon the observation that it is possible, especially when maintaining a relatively high temperature in the combustion chamber preferably by addition of combustible gas, to utilize the heat contents of the fumes for a novel thermal treatment of the zinc oxide suspended in the gases which in its refining effect surpasses the processes hitherto employed for improving the quality of zinc white.

One essential feature of my invention is the prevention of the rapid cooling of the fumes produced by the combustion of the zinc vapor, or more especially a definite retardation in the drop of temperature, while the latter is still above what is generally styled as a red heat. This retardation may be effected in part by obviating the causes of the steep temperature drop above referred to, viz.: the large excess of air usually introduced into the fume, and the rapid dissipation of heat by radiation on its way from the place of combustion to the precipitation apparatus.

My invention moreover provides a new scheme for causing a definite break in the sloping temperature curve, preferably within the range of about 800° to about 500° C., or more closely between 750 and 600° C. Within these temperature limits (which are however not to be considered as exclusive) provision is made for keeping the fumes at an approximately constant or but slightly decreasing temperature for a certain period of time. This check on the temperature gradient according to my invention is caused by or combined with a suitable retardation in the flow of the fumes on the way from the place of their origin to that of their deposition. I prefer to locate this retardation both in the flow of the fumes and in their temperature gradient as near as convenient to the place of formation, thus avoiding an excessive drop of temperature up to that point.

In order to effect this combined retardation and heat retention I provide means for temporarily withholding or arresting the fumes during their passage through an interposed space of suitable dimensions preferably so disposed and insulated that losses of heat by radiation or conduction therefrom are practically eliminated, which is quite opposite to the hitherto practiced method calling for a rapid cooling. The check on the passage of the fumes through this space according to a preferred mode of my process may be effected by impeding or throttling the exit of the fumes from said space. For this purpose shutters, dampers or the like may be employed which also serve for regulating the flow so as to adjust the fume volume leaving the space to that entering the same. The dimensions of this interposed space evidently should be sufficient to cause an appreciable staying or slight stagnation of the fume, which, however, should not go so far as to give rise to a substantial deposition of oxide from the fumes within the said space.

Moreover the "staying" of the fume in the transit space, serving in a certain measure as a "gas cushion", will naturally give rise to a slight pressure increase within this space, so that it may eventually be somewhat higher than the atmospheric pressure.

To this combined "staying" of flow, temperature and pressure I attribute the remarkable improvement of the quality of the zinc oxide deposited from the fumes treated according to the process hereinbefore outlined.

I shall now proceed to describe by way of an example, one convenient embodiment of my process with reference to the annexed drawings, showing in a diagrammatic manner a suitable apparatus for carrying out my present invention and forming part thereof and in which;

Figure 1 is a diagrammatic view in substantial vertical cross section of a typical zinc oxide plant modified in accordance with my invention, and Figures 2 and 3 are diagrammatic cooling curves according to the new process and according to established practice.

Referring to Figure 1, A represents a retort furnace containing any number of retorts or muffles 1, partially filled with molten zinc or other zinciferous material. By means of the pipe 2 a sweeping gas preferably of reducing character is introduced into the retort 1 in the usual manner, by which the volatilization of the zinc within the retort is promoted and the zinc vapor is swept out of the retort through the orifice 3. To the exiting stream of the zinc vapor and the gas comingled with the same an additional quantity of combustible gas is fed from underneath by means of the pipe 4 or if desired the introduction of the addition gas may be disposed in accordance with my U. S. Patent No. 1,842,287. The zinc vapor and the combustible gas from the pipes 2 and 4, upon entering the combustion chamber B, mix with the surrounding air (admitted by the opening 5 in the front wall of the combustion chamber B) and burn with a bright white and slightly tinted flame 6, thereby giving rise to a white smoke or zinc fume 7.

Since the oxidation of zinc vapor is strongly exothermic, its combustion temperature is very high. The volume of the flame being still augmented by the admixture of combustible gas, the temperature of the fume entering into the upper part of the chamber B is correspondingly high. Through the passage 9 the fumes pass into the chamber C which is surrounded by insulating walls. By the relative position of the entrance 9 and exit port 10 it is adapted to cause a whirling motion of the zinc fume, as indicated by the arrows. In consequence of this whirling motion the fume is arrested or stayed in its passage through the chamber C. The bottom of this chamber moreover is provided with hoppers 13 for emptying frome time to time any oxide precipitated in the chamber C.

A vertical sliding shutter 11 is adjustably suspended in front of the exit port 10, as indicated in the drawings. The fumes leaving the chamber C enter into the precipitating or collecting room D which is subdivided by partitions into compartments 14, provided with hoppers 15. The flow of the fumes or gases through the chamber D is indicated by the semi-circular arrows. Any number of compartments 14 may be added to ensure complete precipitation of the oxide. At the end of the depositing chamber D a fan or similar device (not shown in the figure) may be provided to draw the fumes and residual gases through the various compartments.

The operation of the apparatus will be readily understood from the foregoing description. The zinc in the retort 1 is evaporated and the resulting vapor is burned together with the gas introduced through the pipes 2 and 4, while it passes out through the orifice 3. The shutter 11 is then adjusted so as to cause a slight increase of pressure within the chamber C, while a sufficient depression is maintained within the precipitating chamber D, by regulating the draught of the exhausting fan (chimney or the like) at the end of the series of compartments 8 (not shown in the figure).

The temperature in the chamber C is primarily determined by the combustion temperature of the zinc vapor etc., in the combustion chamber B and by the heat insulation of the connecting duct and the chamber C. These factors are more or less given by the operation and capacity of the furnace and the design of the chambers B and C. As a variable factor for keeping the temperature in the chamber C within the desired limits, the quantity of air admitted through the opening 5 in the front wall of the combustion chambers B may be regulated beyond that quantity which is required for the complete combustion of the zinc vapor and the combustible gas introduced by the pipes 2 and 4, or by introducing an extra quantity of combustible gas into the combustion chamber.

*Comparative time.*—Temperature curves are shown in Figures 2 and 3 and show the definite break in the cooling curve by the new process as compared to the nearly straight slope of the cooling curve of the old process. Different operating conditions will bring about different characteristics of the curves, but at the range from 800° C. to 500° C., the cooling rate is materially retarded as shown on the curve. These temperatures may vary somewhat.

A mode of regulation of the flow of the fumes retorts (1) is connected to a common combustion the chamber C may be taken from the following.

Example

A section of a furnace (as A) containing four retorts (1) is connected to a common combustion chamber B, a heat retention room C and a precipitation chamber D.

The temperature of the burning zinc vapor 6 is approximately 1200° C.

The quantities of air and gas admitted by the shutter 5 and pipes 2 and 4 respectively, in conjunction with the damper 10 are so adjusted that the temperature within the chamber C is kept near 700° C.

With respect to the affixed claims I wish to point out that my invention is by no means limited to the methods and means hereinbefore described by way of example nor to the apparatus described above and depicted by the drawings.

Thus for instance, the heat retention chamber C may be combined with the combustion chamber B to form a part thereof or an annex thereto.

Various other changes may be made in the details disclosed in the foregoing specification without departing from the spirit of my invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:

1. The method of producing zinc oxide which comprises vaporizing zinc metal by boiling in an externally heated muffle, burning the vapors within a combustion chamber in the presence of a quantity of oxygen-containing gas sufficient to oxidize the vapors and to convey the oxidized product to a precipitation zone, simultaneously retarding the flow and the rate of cooling of the resultant fumes within the range from 800 to 500° C. while passing the fumes, prior to the precipitation step, through a confined insulated space interposed between the combustion chamber and the precipitation zone without substantial precipitation in said space, and precipitating zinc oxide in the precipitation zone.

2. The process according to claim 1, characterized by throttling the passage for the fumes from the confined space to the precipitation zones.

3. The process according to claim 1, characterized by adjustably constricting the exit of the fumes from the confined space to the precipitation zone.

4. The method of producing zinc oxide which comprises vaporizing zinc metal by boiling in an externally heated muffle, passing the zinc vapors to a combustion chamber and burning the same in the combustion chamber to zinc oxide, passing the resultant fumes into an insulated swirling and mixing chamber, maintaining the volume of and the gas in said combustion chamber and said swirling and mixing chamber at such a velocity that substantial precipitation of zinc oxide therein is avoided, retarding the flow of the fumes through said swirling and mixing chamber by swirling and mixing the gas in said chamber and by restricting the outlet therefrom so as to retard the cooling of the fumes in the range between 800° and 500° C., and precipitating zinc oxide beyond said swirling and mixing chamber.

HUGO REINHARD.

CERTIFICATE OF CORRECTION.

Patent No. 2,053,249.  September 1, 1936.

HUGO REINHARD.

It is hereby certified that error appears in the printed specification of the above numbered patent requiring correction as follows: Page 3, first column, line 30, strike out "retorts (1) is connected to a common combustion" and insert instead as well as their temperature and pressure within; and that the said Letters Patent should be read with this correction therein that the same may conform to the record of the case in the Patent Office.

Signed and sealed this 27th day of October, A. D. 1936.

(Seal)  Henry Van Arsdale
Acting Commissioner of Patents.